_United States Patent_ [15] 3,706,886
Siebecker et al. [45] Dec. 19, 1972

[54] OPTICAL ELECTRONIC PROCESS AND APPARATUS FOR RECORDING TEMPERATURE PICTURES

[72] Inventors: Hans Siebecker, 6906 Leimen; Gunter Wichmann, 69 Heidelberg; Georg Kurotschka, 75 Karlsruhe, all of Germany

[73] Assignee: Eltro GmbH & Company, Heidelberg, Germany

[22] Filed: Dec. 2, 1968

[21] Appl. No.: 781,304

[30] Foreign Application Priority Data

Dec. 1, 1967 Germany..................P 16 23 426.7

[52] U.S. Cl............................................250/83.3 HP
[51] Int. Cl..................................................G01t 1/16
[58] Field of Search....250/83.3 HP; 343/5 PC, 6 HF; 356/28, 141, 152

[56] References Cited

UNITED STATES PATENTS 3,448,267   6/1969   Blythe et al. .........................250/83.3

_Primary Examiner_—Richard A. Farley
_Attorney_—Waters, Roditi, Schwartz & Nissen

[57] ABSTRACT

A technique is provided for recording temperature or thermal pictures by optically scanning a thermally characterized scene in stripwise manner to produce electrical signals which are converted into visible strips which are juxtaposed to give a visible image. The scanning is effected by the use of a displaceable scanning element located at a scanning station as a result of which there is an increased field of scan as the element scans further from the station. The increased field results in distortion and undesirable overlap in the juxtaposed strips. The method of the invention deals with compensating the increased field of scan to avoid the aforenoted distortion and overlap. One manner by which the compensation is effected is by selectively turning off certain receiving elements during the scanning operation. Another way relates to the fact that the receiving elements are coupled to luminescent diodes, each of which represents an increment of the final picture. In this arrangement the invention provides for uniquely coupling the luminescent diodes to a recording film by means of fiber optics peculiarly shaped and/or disposed for purposes of compensating the peculiarity of the scanning arrangement noted above.

10 Claims, 19 Drawing Figures

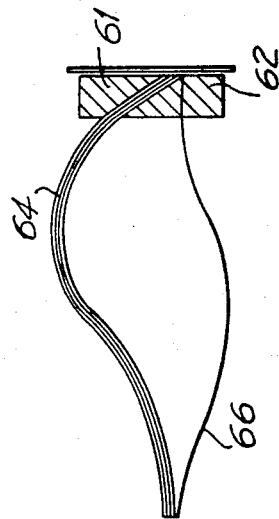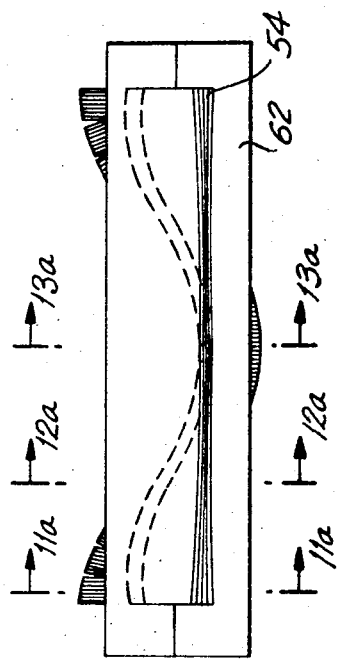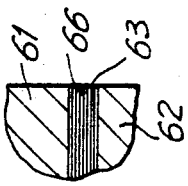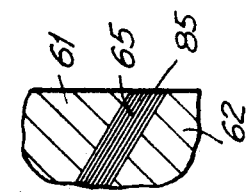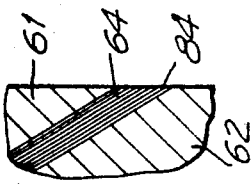

OPTICAL ELECTRONIC PROCESS AND APPARATUS FOR RECORDING TEMPERATURE PICTURES

DRAWING

FIG. 1 diagrammatically illustrates a scanning operation;

FIG. 2 diagrammatically illustrates the reproduction of two terrain strips scanned by conventional means with width increasing from the middle outwards;

FIG. 3–5 diagrammatically illustrate varying connections between the receiving elements and the luminescent diodes for adapting the strip scanned to the strip transferred to the film;

FIG. 6 diagrammatically illustrates the scanning;

FIG. 7 diagrammatically illustrates the reproduction of two strips which have been scanned with the use of the circuit connections of FIGS. 3, 4 and 5;

Figure 1:
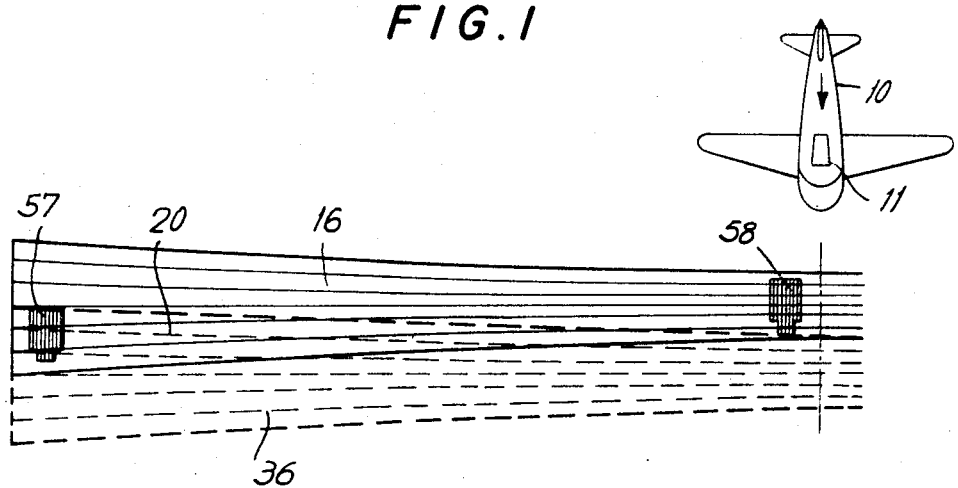
Figure 16:
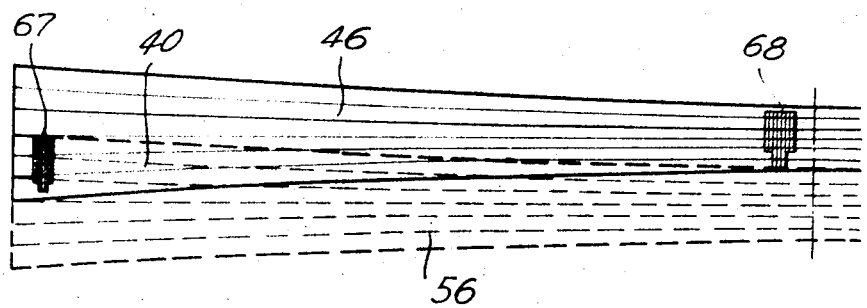

FIGS. 11($a$)–13($a$) illustrate one section each through the portion of the shaped pieces facing the film with the last piece of the glass-fiber ahead of the cut-off end, in the sectional planes A—A, B—B and C—C of FIG. 14;

FIGS. 11($b$)–13($b$) show the shapes of the fiber ends in the exit planes;

FIG. 14 is a view from below of the shaped pieces with pressed-in glass fiber elements, seen from the film side;

FIG. 15 is a section through the support pieces with a stem or parcel of glass fibers; and FIG. 16 is a reproduction, by the method explained with reference to FIGS. 11–15, of two adjacent strips scanned by the same method as shown in FIG. 1.

DETAILED DESCRIPTION

This invention relates to improvements of optical-electronic processes and equipment for the recording of temperature pictures by aerial reconnaissance vehicles.

In one process of the above-mentioned type, a scanning unit is used which has a predetermined viewing angle $\omega$, and divides the overflown terrain into strips transverse to the direction of flight, which are successively scanned from one side to the other. The thermal radiation received at the indicated viewing angle is transferred to n receiving elements arranged in a row, of which each receives radiation corresponding to a viewing angle $\omega/n$, which, after optical-to-electronic conversion, passes along separately in the form of electrical signals. These electrical signals, after amplification, are reconverted to optical signals serving for recording the thermal picture.

Since the strips of terrain are being scanned by a rotating system of prisms or mirrors, and since the distance from the aerial vehicle to the individual scanned area elements of the terrain strip increases from the center towards the outer ends, the width of the area elements captured by the line scanner increases correspondingly on account of the constant viewing angle $\omega$.

Accordingly the strip of terrain recorded during one complete sweeping movement of the prism, or mirror system, does not have a rectangular shape, but rather the shape of a strip narrow in its middle and gradually increasing in its width toward the outer ends.

In recording on film the temperature image of the strip of terrain, this widening towards the edges does not show up, because in the recording method disclosed in the aforesaid process recording is effected with luminescent diodes and the reproduction of the luminous area of the luminescent diode on the film is independent of the scanning angle. The terrain strip widening towards its edges is thus represented on the film as a strip of uniform width, so that the outer area elements are presented on a smaller scale than the inner ones.

If it were possible, by means of pivotable optics — for example, by simultaneous modification of focal length with the scanning angle — to record the strips of terrain in such a manner that they would have identical width over their entire length, then the angular velocity of the sweeping movements could be chosen relative to the speed of the aerial vehicle and its altitude in such a manner that the recorded strips of terrain would be immediately adjacent. Since, actually, the recorded strips of terrain increase in width from their center towards their edges, it is appropriate to correlate the angular sweep velocity in such a manner with flight speed and flight altitude that the terrain strips recorded will be contiguous at their narrowest points. However, if the strips are recorded in the manner indicated, there will be partial overlapping of the widening outer surface areas.

Through this overlapping in recording and the juxtaposition without overlap in reproduction, the thermal image is reproduced with distortion and it can occur that in the overlapping corners of two successive strips of terrain an object may be scanned twice, and also appear twice in the reproduction, however at different places on the film.

An object of the invention is to improve the aforesaid process in such a manner the erroneous indications of said kind disappear, or that the distortions of the thermal image due to the overlapping are prevented. This problem can be solved in two manners.

The first solution consists in that, during the scanning of the terrain, the viewing angle of the scanning unit is modified in such a manner that a terrain strip of uniform width is scanned and thus conformed to the shape of the strips transmitted to the film by means of the luminescent diodes.

This can, for example, be done by switching off outlying receiving cells in a defined manner as the scanning angle increases, with simultaneous reconnection of the outlying luminescence diodes to receiving elements located farther inside. In this manner, the luminescence diodes receive only signals received from a terrain strip of uniform width, and overlaps are excluded.

A second possibility for solving the problem consists of adapting the shape of the strips transferred to the film by the luminescence diodes to the shape of the strips received by the receiving elements in the scanning.

In this recording mode, the image recorded conserves the shape of the strip of terrain widening outwards from center. In order to avoid skipping terrain portions in the middle, the angular velocity of the sweep motion of the moving picture of the scanning optics is chosen in such a manner relative to flight speed, aperture of the objective and distance of aerial vehicle from ground, that two successive strips are contiguous at their narrowest portions. The overlapping of the individual strips in the outer regions is voluntarily accepted in this mode.

In this method, the receiving elements receive radiation from terrain strips of varying width, with the overlapping corners of contiguous strips being recorded twice. Following a further idea of the invention, the image elements received by the receiving elements on ever decreasing scale during the sweep movement of the receiving optics from its middle portion outwards are correspondingly reenlarged in the optical system following the luminescence diodes, so that the strip image transferred to the film corresponds in its shape to the shape of the scanned strip of terrain.

In this mode of reproduction, the outer corners of two sequential strips overlap also in reproduction. Consequently, an object located in the outer corner of a strip of terrain, even if it is recorded twice, will only be reproduced once in spite of its double exposure. Actually, the double exposure has a beneficial effect since, for all practical purposes, it means a lengthening of exposure time.

The enlargement of the outer zones of the image reproduced can be effected in various manners. It has been found particularly simple and appropriate to use glass-fiber optics for this purpose. This could, for example, be done by enlarging the output openings of the glass-fiber strands at the planar end facing the film by a certain ratio from the inside toward the outside in an appropriate flare-out. In other words, the exit cross-sections of the glass fibers on their planar output side are steadily on the increase from the middle towards both ends.

This enlargement of the exit cross-sections can be achieved by having the, in themselves homogenous, glass fibers transmit at their exit ends into gradually flaring-out glass-fiber enlarging elements, and increasing the coefficient of this enlargement as the distance of each fiber strand from the center zone of the glass-fiber stem increases. This increase of enlarge-ment could be arranged to be continuous. However, it is recommended to have it proceed stepwise, in order to simplify production. the disadvantage of a stepped increase of enlargement is acceptable, because it will be hardly noticeable on account of the minute width of the strips.

Another possibility for achieving the enlargement of the exit cross-sections consists of leading the glass-fiber strands at a defined angle of slant to the planar exit surface, instead of at a right angle. This angle will have to become narrower and narrower, the farther the glass-fiber strand is from the center of the parcel or stem. The planar end surfaces of the individual fibers then become ellipses of varying eccentricity. In this manner, a continuous enlargement of the image arriving from the luminescent diodes is achieved, through which the scale modification, which occurred in scanning the strip of terrain is cancelled out again.

The possibilities for application of the process and the device are by no means limited to aerial reconnaissance vehicles. They can be utilized for any case where a linear strip of terrain is to be scanned by the sweeping movements of a pivoting scanning optics.

Figure 2:
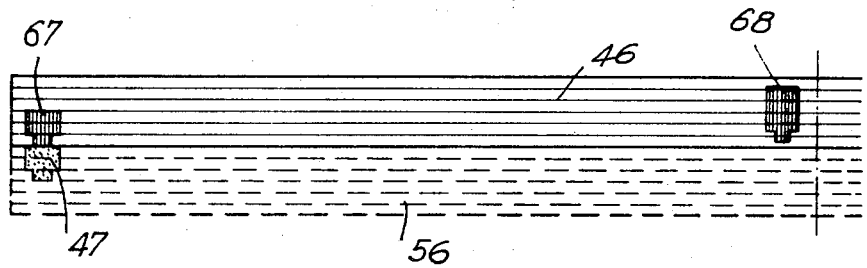

The drawing reflects the result of the various procedures and means for avoiding erroneous indications. Let it be assumed, relative to FIG. 1, that the aerial vehicle or scanning station 10 is moving downwards in FIGS. 1 and 2. Let is also be assumed that the rotary motion of the recording apparatus is counter-clockwise. The scanning device is indicated at 11 and scans strips transverse to the direction of movement of vehicle 10. Received energy is passed on to receiving elements as discussed hereinafter.

Under these premises, the solidly framed strip 16 is first of all scanned from right to left, i.e. from the inside outwards. Since this strip becomes wider towards the edge, and since the scanning speed has been correlated with flight speed and altitude in such a manner that in each case two successive strips, in this case 16 and 36, are contiguous at their most narrow portion, an outward inset 20 of overlapping corners is created, which is exposed both in the first sweep (strip 16 scanned) and in the next following sweep (strip 36 scanned).

In the reproduction of the strips recorded in this manner according to the methods known hitherto, the two successive strips 16 and 36 appear reproduced as strips of identical width 46 and 56 (FIG. 2), with the objects perceived at the outer edge being represented on a reduced scale.

An armor unit 58 discovered in the center of the strip, appears in the image reproduction as an undistorted picture 68. If, however, another tank 57 happens to be located in the doubly scanned area 20, it will appear foreshortened in the reproduced picture, but double as images 67/47. This distortion can be eliminated by the momentary switching-off of individual receiving elements.

Figure 3:
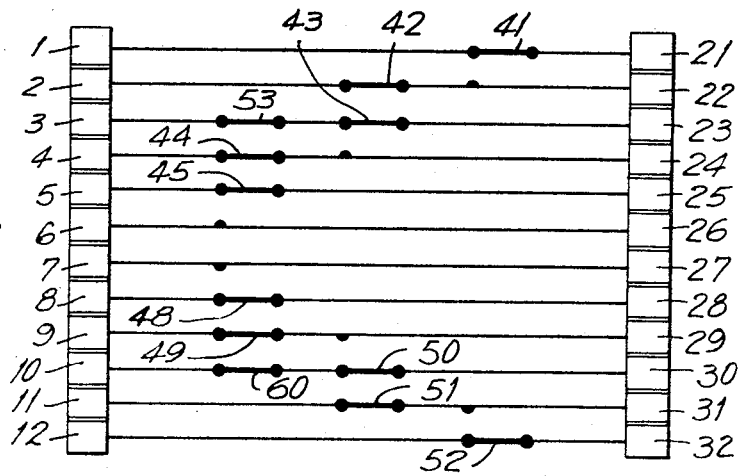
Figure 4:
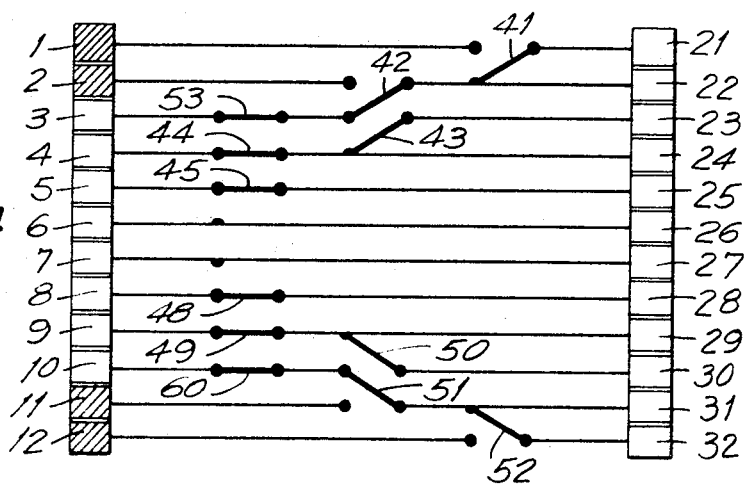
Figure 5:
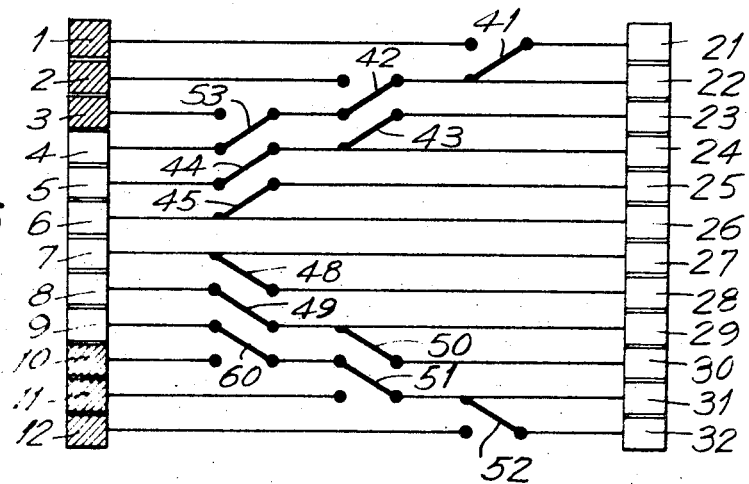

In FIGS. 3–5, the receiving elements are referenced as 1–12 and the diodes supplied thereby as 21–32. Elements 41–45 are switches arranged in the leads connecting receiving-elements/diodes 1/21, 2/22, 3/23, 4/24, 5/25. In a similar manner, the switches 48–52 are inserted into the connecting leads between receiving elements and diodes 8/28, 9/29, 10/30, 11/31, 12/32. The leads 3/23 and 10/30 each contain an additional switch 53 or 60, respectively.

In a scanning movement from the inside outwards, initially all leads are switched on. As the received light beam travels outwards, first the switches 41 and 52 are actuated in the manner shown in FIG. 4 and the cells 1 and 12 are thereby switched off. The diodes 21 and 32 continue to receive current via the leads 2/22 and 11/31. As the beam travels further outwards, the leads 2/22 and 11/31 are interrupted and, simultaneously, through operation of the switches 43 and 50, the diode 23 is transferred to the receiving element 4, and the diode 30 to the receiving element 9. When the beam moves still farther outward, the receiving cells 3 and 10 are also switched off, resulting in the diagram according to FIG. 5.

In this circuit the receiving cell 4 is connected to the diodes 21 and 22, cell 5 to the diodes 23 and 24, and cell 6 to the diodes 25 and 26. Likewise cell 7 is connected to the diodes 27 and 28, cell 8 to diodes 29 and 30, and cell 9 to diodes 31 and 32. Thus, each receiving element is now connected to two diodes.

Figure 6:
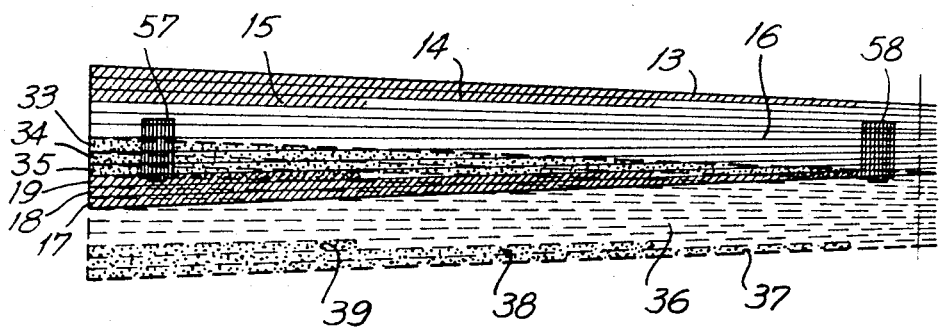

In the scanning of two consecutive terrain strips, this has the effect that with movement of the beam from inside outwards first the partial strips 13 and 17 (see FIG. 6) of strip 16, then the partial strips 14 and 18, and finally partial strips 15 and 19 are not scanned, so that in one scanning sweep a strip of essentially uniform width is processed.

The same applies concerning the subsequently scanned strip, of which in succession the partial strips 33 and 37, 34 and 38, and 35 and 39 are switched off.

Thereby it is achieved, that the area 20 (FIG. 1), which was always scanned twice in conventional scanning processes, is only scanned a single time and this in the area covered by the partial strips 33, 34, 35 during the scanning of strip 16, and in the area covered by the partial strips 17, 18, 19 during the scanning of strip 36.

Figure 7:
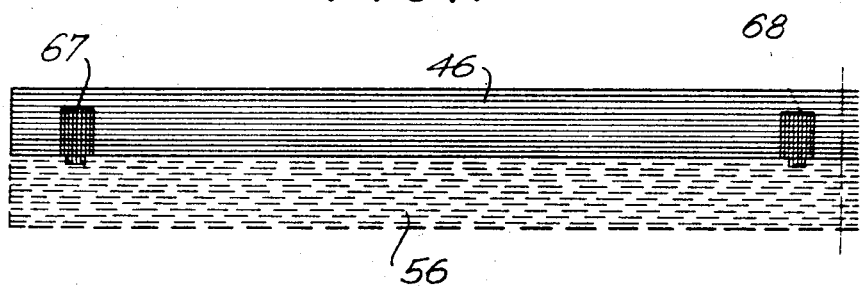

In the reproduction of the terrain strip scanned in this manner, the tank 57 appears only once, as picture 67 (FIG. 7), and in the same size as the tank 58 scanned in the middle appears as picture 68. In this process, the scanned strip is thus adapted in its size to the reproduce strip.

Figure 8:
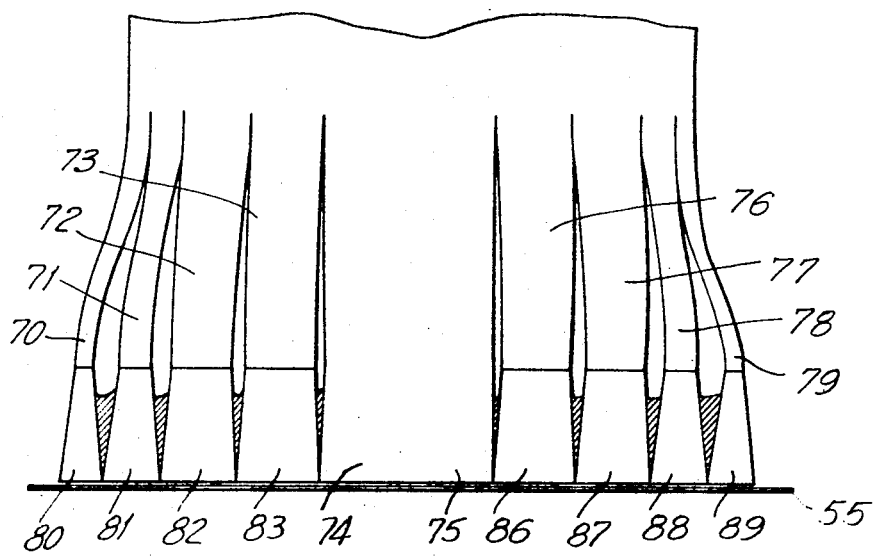
FIG. 8 illustrates the film-oriented exit cross-sections of the fiber strands terminating in enlarging glass-fiber elements.
Figure 9:
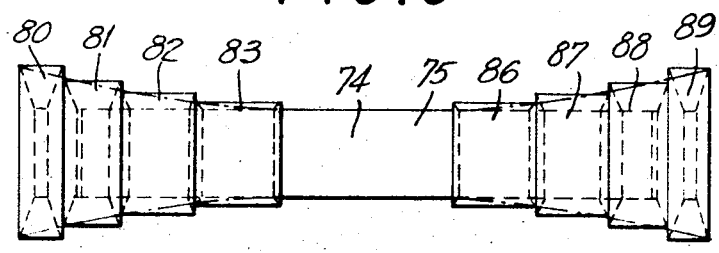
FIG. 9 is a view from the bottom of the enlarging glass-fiber elements.

In FIGS. 8 and 9, there are reproduced the ends of individual strands of a glass-fiber parcel or stem, which lie opposite the film 55.

These individual glass-fiber strands are referenced as 70–79. Whereas the strands 74 and 75 are brought to the film uncharged, the strands 70–73 go over into enlarging fiber elements 80–83, whose width steadily increases towards the outer edge. In the same manner, the strands 76–79 terminate in the enlarging element 86–89.

Figure 10:
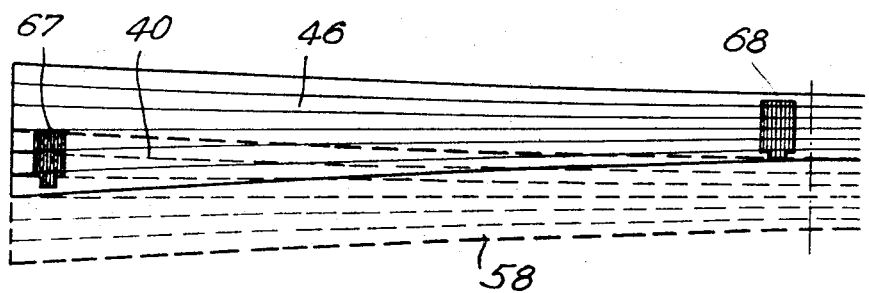
FIG. 10 is the reproduction of a strip scanned by the method of FIG. 1, realized by means of enlarging glass-fiber elements according to FIGS. 8 and 9.

These enlarging elements have the effect of making the strip recorded on the film increasingly wider from the inside to the outside as represented in FIG. 10. With this method, two consecutively recorded strips also overlap each other on the film in a corner or ear 40. Thus, a tank 57 scanned in the area 20 (FIG. 1) will now also appear as a single tank 67, and lies in the doubly reproduced ear or corner 40. Here, the reproduced image has been adapted in its shape to the scanned strip of terrain, whereby distortions have been eliminated.

An effect similar to that of FIGS. 8 and 9 can also be achieved by cutting off at a slant the glass-fiber strands at the point where they come out of the shaped pieces lying opposite the film, as is shown in FIGS. 11–15.

Whereas FIGS. 14 and 15 represent the glass-fiber stem or parcel with the shaped pieces 61 and 62 attached at its end, FIGS. 11–13 show partial cross-sections along planes A—A, B—B, C—C on enlarged scale.

In order to achieve the necessary slant at the extremities, the individual glass-fiber strands are bent in various shapes. FIG. 15, for example, shows a section through strand 64 in plane A—A. Another strand issuing approximately normally from the partial pieces 21, 22 is suggested by the line 66.

As it can be seen, the angle at which the glass-fibers are arranged in the terminal pieces preceding their exit increases from outside inwards. Thus, for example, strand 64 in FIG. 11 runs at a sharper angle at the exit plane than strand 65 in FIG. 12, and the angle formed by the latter with the exit plane is again smaller than the one which strand 66 forms with the exit plane, which corresponds to approximately 90°.

The surfaces of the sections through the individual strands are ellipses of varying eccentricity as can be seen from FIGS. 11b, 12b, and 13b. The sections 63 in FIG. 13(b) according to their angle of incidence of 90° are circular.

The result of the corrective facility discussed relative to FIGS. 11–15 is represented in FIG. 16. This figure shows the reproduction of two widened strips, which have thus been adapted to the shape of the strips scanned.

The ear covered by both overlapping strip portions is referenced as 40. The heavily framed strip is 46, the strip within the frame of dashes is 56.

FRom the reproduction it can be noted that, in conformity with the strip scanned (FIG. 1), only one armored unit 57 is reproduced as only one image 67.

In comparison with the normal picture 68, the picture is distorted only in that the increasing width is reproduced on a reduced scale. However, this method avoids the double reproduction of a single object scanned in the ear or inset 20 (FIG. 1).

What is claimed is:

1. A method comprising optically scanning a thermally characterized scene in stripwise manner to produce electrical signals which are converted into visible strips which are juxtaposed to give a visible image, the scanning being effected by the use of a displaceable scanning element located at a scanning station whereby there results an increased field of scan as the element scans further from said station, the increased field tending to result in distortion and undesirable overlap in the juxtaposed strips, said method further comprising compensating the increased field of scan to avoid the distortion and overlap.

2. A method as claimed in claim 1, wherein said station is a movable vehicle and the scanning element is operated to scan transversely across the direction of movement of the vehicle, the element scanning successive strips which widen in proportion to the distance from the vehicle, the element being provided with an alignment of receiving elements corresponding to successive increments across the width of the strip for converting infra-red signals to electrical signals, the element moreover being provided with transducers corresponding to the receiving elements for converting the electrical signals to visible signals arranged to constitute a visible image.

3. A method as claimed in claim 2, wherein the compensating is effected by selectively deactivating the receiving elements as the scan proceeds further from the vehicle.

4. A method as claimed in claim 2, wherein for purposes of the compensating the juxtaposed strips are juxtaposed at their narrowest portions and overlap at the extremities thereof.

5. A method as claimed in claim 2, wherein the visible signals are conveyed to a film for recording and, while being conveyed, are adjusted in area to effect the compensating.

6. Optical-electronic apparatus for recording a thermal picture, said apparatus comprising a plurality of receiving elements corresponding to alignments of increments of strips which cooperatively correspond to said picture, scanning means to scan successive strips of a thermal scene to expose said receiving elements to the same whereby are produced a plurality of electrical signals, the strips having a width increasing in proportion to the distance from the scanning means, transducer means to convert the electrical signals to visible signals, and compensating means to compensate the increasing width of the strips so that the strips can be assembled and juxtaposed without distortion and undesired overlap.

7. Apparatus as claimed in claim 6, wherein the transducer means are luminescent diodes and the compensating means includes switches coupling the diodes to the receiving elements and arranged for selectively switching off the receiving elements as the width of the scanned strip increased.

8. Apparatus as claimed in claim 6 wherein the transducer means are luminescent diodes, comprising optical fibers for conveying light signals from the diodes to a film.

9. Apparatus as claimed in claim 8, wherein the fibers are arranged with varying widths corresponding to the strip.

10. Apparatus as claimed in claim 8, wherein the fibers are arranged with varying angles at a light exit plane.

* * * * *